July 29, 1941.　　　M. K. HEDGE　　　2,250,832
FLY CASTING FISHING LINE
Filed April 18, 1939　　　2 Sheets-Sheet 1
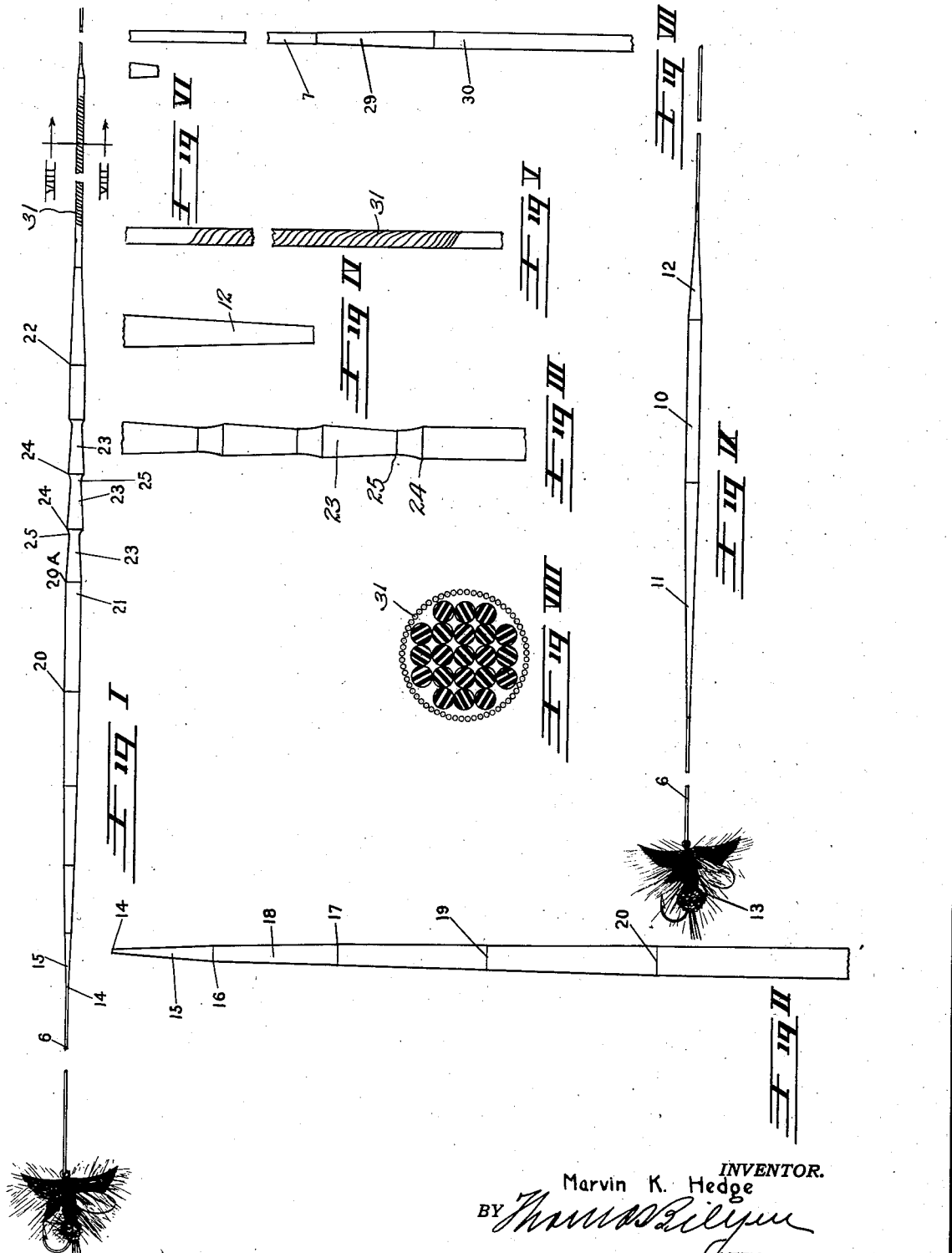
INVENTOR.
Marvin K. Hedge
BY
ATTORNEY.

July 29, 1941.　　　M. K. HEDGE　　　2,250,832
FLY CASTING FISHING LINE
Filed April 18, 1939　　　2 Sheets-Sheet 2
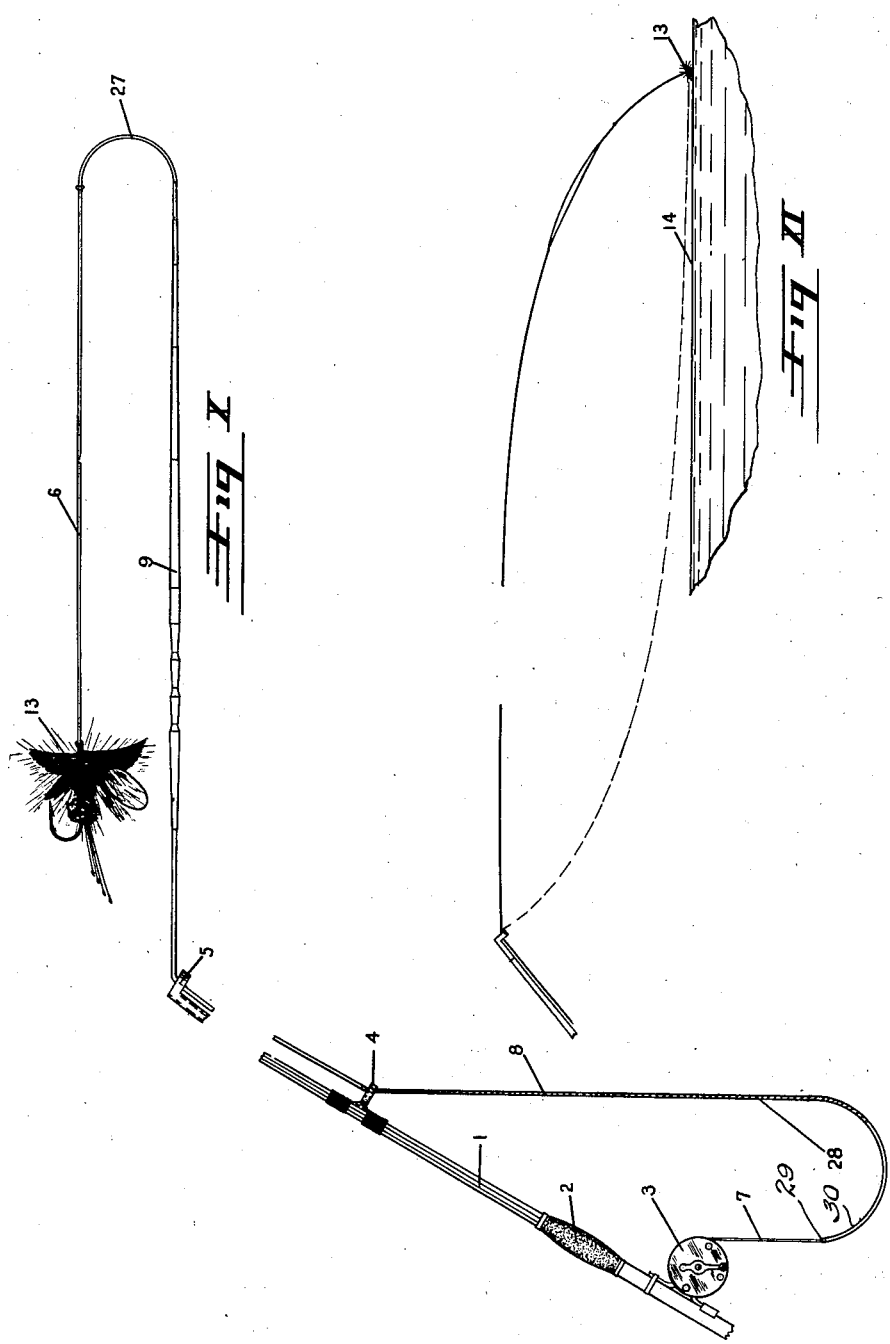
INVENTOR.
Marvin K. Hedge
ATTORNEY.

Patented July 29, 1941

2,250,832

UNITED STATES PATENT OFFICE 2,250,832

FLY CASTING FISHING LINE

Marvin K. Hedge, Portland, Oreg.

Application April 18, 1939, Serial No. 268,631

12 Claims. (Cl. 43—27)

My invention relates to improvements in fly casting fishing lines.

My invention is intended to be used for accurate and distant casting.

A further object of my invention is to provide a line which permits the hook to be deposited upon the water in advance of the line.

My invention comprises a line, the forward end of which is convexly tapered.

My invention is comprised of a line to which a leader is attached upon its forward end and with a uniformly increasing taper being provided upon the leading end of the line adjacent the leader and with the increase in diameter forming a convex instead of a concave taper.

In the belly portion of the weighted part of the line, I provide a structure that is made up of a plurality of spaced sections, with the forward end of each of the sections being of largest diameter and uniformly tapering rearwardly therefrom to the next section.

I delineate distinctive markings upon the hand portion of the line to indicate to the user of the line the precise position of the line.

The base portion of my line is the weighted part of the line.

With these and incidental objects in view, the invention consists in certain novel features of construction and combination of parts, the essential elements of which are set forth in the appended claims, and a preferred form of embodiment of which is hereinafter shown with reference to the drawings which accompany and form a part of this specification.

In the drawings:

Fig. I is a fragmentary side view of a fishing line having a leader and hook associated with one end of the line and having the running line associated with the other end of the line.

Fig. II is a fragmentary plan view of the leading end of the line made to illustrate the shape of the front tapered end of the line.

Fig. III is a fragmentary plan view of a part of the midsection of the belly of the line. Enlargement and details of constructions are shown as being disposed at spaced intervals along the line. The concavities shown are disposed at spaced intervals in the midsection of the line.

Fig. IV is a fragmentary plan view of the back taper of the line.

Fig. V is a fragmentary plan view of the uniform diameter of an enlarged line section that is disposed between the back taper and the holding line. In this view is shown the holding portion of the line.

Fig. VI is a fragmentary plan view of the tapered portion of the line that is disposed between and at the juncture of the holding line and the running line.

Fig. VII is a fragmentary plan view of the base end of the running line and of that portion of the running line where the same is joined to the base end of the line.

Fig. VIII is a sectional end view of the holding portion of the line as it may be used back of the weighted portion of the line. This view is taken on line VIII—VIII of Fig. I looking in the direction indicated. In Fig. VIII the section indicated may be made at a number of places, as the holding line is of uniform diameter in each size of the line.

Fig. IX is a plan view of a balanced light weight fly line. In this view the hook and leader are shown as being directly attached to the front end of the line.

Fig. X is a fragmentary side view of a fish rod illustrating the line as running through and between the eyes disposed adjacent the handle of the rod and at the tip of the rod and illustrating the belly of the line as being in position for casting and illustrating the leader and handle as being rearwardly extending from the juncture of the front taper tip and the leader, and illustrating the holding line in a loop disposed adjacent the reel.

Fig. XI is a fragmentary side view of a shot line and illustrating the position that the shot and the final position of the fly upon the surface of the water will take when the line, illustrated in Fig. X is properly cast.

Like reference characters refer to like parts throughout the several views.

In the drawings, 1 is the fishing rod; 2 is the handle of the rod and 3 is the reel. The line is run through a plurality of eyes, the inner or lower one is shown at 4 and the outer one or the one disposed at the tip end of the rod is shown at 5. The weighted portion of the line is disposed between the leader 6 and the running line 7 with a holding line 8 communicating the belly 9 of the weighted portion of the line with the running line.

Heretofore, it has been the general custom for many years to place the weighted line between the leader and the running line without any particular stress being placed upon the shape or relative lengths of the belly portion of the line. While for short casts, satisfactory results are to be obtained when the line is made as illustrated in Fig. IX in which the central portion of the belly of the line was of a uniform diameter for a limited distance, then uniformly tapering on the front end as illustrated at 11, to where the same is attached to the leader 6, with the line also uniformly tapering as illustrated at 12 on the trailing portion of the weighted portion of the line. But when longer casts are attempted, with a line of this kind, it is difficult to make the hook 13 drop on the surface of the water 15, as illustrated in Fig. XI in advance of any portion of the line reaching the water between the hook and the tip of the rod.

In fishing, if the line reaches the water in advance of the lure and the line runs out on the water with the final deposit of the lure and the hook on the water, many species of fish and especially trout are frightened because of the disturbance being made on the surface of the water resembling that of a water snake, and the fish are frightened away from the fly before the same lights on the water. Whereas, in a properly designed line for long casting, as illustrated in Fig. I, casts approximately 175 feet may be made with the fly reaching and becoming deposited on the water in advance of the line settling down on the surface of the water. If the line is unbalanced the hook and fly may fall short of the weighted portion of the line, to thereby make it ineffective or the line may overrun the fly and be deposited, after which the line would overshoot the fly, to thereby make a disturbance on the water, to thereby tangle the line, making efficient casting difficult and thereby slow up the fishing operations by greatly reducing the number of casts that may be made in the allotted fishing time.

I have found that by making the leading end of the line as illustrated in Figures I and II, long and efficient casts may be made. The leader 6 is attached to the front of the taper of the weighted portion of the line at 14. The line is progressively increased in diameter for a short space, as indicated at 15. The diameter is further increased progressively from the point 16 to the point 17, by providing additional threads at the portion 18. The distance between the points 17 and 19 is greater than the distance between the points 16 and 17, and the distance between the points 16 and 17 is greater than the ditsance between the points 16 and 14, also the distance between the points 19 and 20 is greater than the distance between the points 17 and 19. The diameter of these portions is such that a longitudinal section through these portions would show the outer surface of the tapered portion of the line as being convex in contour. With this convexity of the tapered portion, more efficient casting results are obtained than if the exterior contour was straight rather than convex. The portion 21 constitutes the belly of the line, and that portion and the part between 20A and 22 is made up of a plurality of sections 23. The forward end 24 of each section has the maximum diameter of the line, and those parts of the line immediately in advance of the maximum diameter portions are curved, and the forward end of these curves have the smallest diameter of the belly of the line. That portion of the space of each section 23 between the planes of maximum diameter and minimum diameter tapers progressively so that the exterior surface represents the surface of a frustrum of a cone.

In the early stages of the cast the fly 13 and the leader 6 will travel parallel to the belly portion of the line with a loop forming immediately beyond the weighted portion of the line and leader, but when an additional pull is exerted by the portion of the line drawn out, the speed of travel of the weighted portion of the line will decrease while the fly and the leader will travel at the same uniform rate so that the shoot of the line, including the running portion of the line, will travel substantially horizontal until the fly and the leader overrun the falling portion of the line, to thereby cause the fly as illustrated in Fig. XI to first be deposited upon the surface of the water. In a lure thus deposited in the cast there is nothing from the deposited lure upon the water in advance of the same being struck by the fish.

In order that the fisherman may have an indication of the relative lengths of the weighted portion of the line and the holding portion of the line, I mark the trailing end 28 of the line with suitable markings 31 to enable the fisherman to precisely know the relative distance the belly portion of the line bears to the holding portion of the line, to thereby enable the fisherman to make accurate castings, and casts of precise distances. The holding portion of the line has a diameter greater than the running portion of the line, and is composed of three parts, the intermediate part having markings thereon.

In Fig. X I have shown the weighted portion of the line, the leader, and the hook in the relative position that they float in the early stages of the cast. In order that the hook and leader may be made to outrun the line when the maximum distance cast is made and in order that the hook may be made to strike the water first as indicated in Fig. XI before the line settles upon the water, I also make the line as illustrated in Fig. VII where the running line 7 is joined to the base end of the line 30 by any suitable tapered connection 29. The base end 30 of the line is made relatively heavy to that of the running line so that the weighted portion 30 will act as a deterrent to slack up the weighted portion 9 of the belly of the line and the running line to thereby permit the leader and the hook to outrun the line and to therefore be the first to be deposited upon the water as illustrated in Fig. XI.

While the form of mechanism herein shown and described is admirably adapted to fulfill the objects primarily stated it is understood that it is not intended to confine the invention to the embodiment herein shown and described, as it is susceptible of embodiment in various forms, all coming within the scope of the claims which follow.

What I claim is:

1. A fish line having a running portion, a holding portion, and a weight portion, each portion having characteristics which clearly distinguish it visibly from the other portions, and the holding portion having a further characteristic whereby the front portion thereof and a rear portion thereof can be observed for positioning the point of meeting of the later portions in predetermined relation to a part of a fishing rod.

2. A fishing line having included therein a weighted portion to be used between a leader and a holding portion wherein said weighted portion has a forward elongated tapered section progressively diminishing in diameter in a forward direction, the longitudinal cross section of which for the length of said tapered section has an outer edge of convex formation.

3. A fishing line including a weighted portion and a holding portion, the weighted portion having two clearly defined sections, one section thereof having a long taper with a longitudinal cross section, which for the length of said taper has an outer edge of convex formation, and a second section composed of smaller tapered parts, one part having a greater length than the others.

4. A fishing line having a weighted portion including a tapered front end, a tapered rear end and intermediate tapered sections, the intermediate tapered sections having enlarged front ends.

5. In a fishing line, a weighted front portion having a convex longitudinal contour, said portion comprising a tapered front section, a belly section, and a tapered rear section, said belly section having a plurality of restrictions therein.

6. In a fishing line, a weighted portion, a holding portion, and a running portion, said weighted portion having a convex longitudinal contour, said weighted portion comprising a front section, an intermediate section, and a rear section, said front section tapering forwardly with a gradually diminishing diameter, and said rear section tapering rearwardly with a gradually diminishing diameter, said intermediate section comprising a plurality of parts, each part having an enlarged front end and tapering rearwardly with gradually diminishing diameter, said holding portion comprising a section having different characteristics.

7. A fish line comprising a running part, a leader, and a weight interposed therebetween, the latter having tapered parts comprising portions which in longitudinal section define edges convex in form, said portions comprising a series of joined tapers, each tapering toward the leader whereby a longitudinally curved surface is provided, and some of said portions being of tapering formation and joined therebetween by a section of uniform diameter, the latter section being of less diameter than the largest diameter of the weight and larger than the diameter of the running part of the line.

8. A fish line comprising a running part, a leader, and a weight interposed therebetween, the latter having tapered parts comprising portions which in longitudinal section define edges convex in form, said portions comprising a series of joined tapers, each tapering toward the leader, whereby a longitudinally curved surface is provided, and some of said portions being of tapering formation and joined therebetween by a section of uniform diameter, the latter portions being of less diameter than the largest diameter of the weight, and a belly part, having various diameters, connected between said portions tapering toward the leader and said portions of tapering formation joined by a section of uniform diameter.

9. A fish line comprising a running portion, a leader, and a weighted portion interposed therebetween comprising a tapered part connected to the leader composed of a series of joined tapers, each tapering forwardly and having a longitudinal cross section having an outer edge of convex formation, a belly portion joined to the largest end of said tapered part and having a part of uniform diameter and also the maximum diameter of the weighted portion joined at the rear to a part composed of a plurality of relatively short tapered sections, each taper diminishing rearwardly, the maximum diameter of the latter tapers each being substantially equal to that of the belly portion.

10. A fish line comprising a running portion, a leader, and a weighted portion interposed therebetween comprising a tapered part connected to the leader composed of a series of joined tapers, each tapering forwardly and having a longitudinal cross section having an outer edge of convex formation, a belly portion joined to the largest end of said tapered part and having a part of uniform diameter and also the maximum diameter of the weighted portion joined at the rear to a part composed of a plurality of relatively short tapered sections, each taper diminishing rearwardly, the maximum diameter of the latter tapers each being substantially equal to that of the belly portion, said short tapered sections each being substantially the same shape and form.

11. In a fishing device, comprising a leader, a weight, and a line connected in series and adapted to be connected to a fishing reel, said weight comprising a front section, an intermediate section, and a rear section, said front section tapering forwardly with a gradually diminishing diameter, said intermediate section comprising a plurality of parts, each part having an enlarged front end and tapering rearwardly with gradually diminishing diameter, and said rear section comprising two tapers tapering rearwardly toward said line, said latter tapers being connected by a section of substantially uniform diameter which diameter is less than the maximum diameter of the intermediate section.

12. A fishing device comprising a leader, a weight, and a line connected in series and adapted to be connected to a fishing reel, said weight comprising a front section tapering forwardly toward said leader with a gradually diminishing diameter, an intermediate section, and a rear section comprising two tapered portions tapering rearwardly toward said line and connected by a section of substantially uniform diameter, said front section taper and said intermediate section each being substantially longer than either of said two rear section tapered portions.

MARVIN K. HEDGE.